United States Patent
Lanzinger et al.

(10) Patent No.: US 7,380,813 B2
(45) Date of Patent: Jun. 3, 2008

(54) FLEXIBLE AIRBAG FLAP

(75) Inventors: Marcus Lanzinger, Mettenheim (DE);
Bernd Sachtleben, Aschau (DE);
Henry Mueller, Landshut (DE);
Herbert Ziegler, Wildenberg (DE);
Thomas Winterhoff, Geisenhausen (DE); Christian Schlemmer, Muenchnerau (DE)

(73) Assignee: Lisa Dräxlmaier GmbH, Vilsbiburg (DE)

( * ) Notice: Subject to any disclaimer, the term of this patent is extended or adjusted under 35 U.S.C. 154(b) by 50 days.

(21) Appl. No.: 11/034,854

(22) Filed: Jan. 14, 2005

(65) Prior Publication Data

US 2005/0184487 A1 Aug. 25, 2005

(30) Foreign Application Priority Data

Jan. 16, 2004 (DE) .................. 10 2004 002 478

(51) Int. Cl.
*B60R 21/20* (2006.01)
(52) U.S. Cl. .............. 280/728.3; 280/728.2; 280/732
(58) Field of Classification Search ......... 280/728.3, 280/728.1, 732, 728.2
See application file for complete search history.

(56) References Cited

U.S. PATENT DOCUMENTS

| | | | |
|---|---|---|---|
| 5,382,047 A * | 1/1995 | Gajewski | 280/728.3 |
| 5,395,668 A * | 3/1995 | Ito et al. | 428/43 |
| 6,065,771 A * | 5/2000 | Kawakubo et al. | 280/728.3 |
| 6,070,904 A * | 6/2000 | Ozaki et al. | 280/743.1 |
| 6,453,535 B1 * | 9/2002 | Nicholas | 29/413 |
| 6,623,029 B2 * | 9/2003 | Sun et al. | 280/728.3 |
| 2003/0230873 A1 | 12/2003 | Bayer | |
| 2004/0026009 A1 | 2/2004 | Ponthieu | |

FOREIGN PATENT DOCUMENTS

| | | |
|---|---|---|
| DE | 195 48 996 C1 | 4/1997 |
| DE | 199 41 442 A1 | 5/2000 |
| DE | 100 40 248 A1 | 3/2002 |
| DE | 101 17 938 A1 | 10/2002 |
| DE | 101 35 224 A1 | 2/2003 |
| DE | 101 51 715 A1 | 5/2003 |
| DE | 102 56 145 A1 | 7/2003 |
| DE | 102 25 813 A1 | 1/2004 |

(Continued)

OTHER PUBLICATIONS

English Abstract of CA 2 416 267 A1, published on Mar. 19, 2003; which corresponds to WO 02/14117 A1.

*Primary Examiner*—Eric Culbreth
(74) *Attorney, Agent, or Firm*—Sughrue Mion, PLLC (57) ABSTRACT

A flexible airbag flap of an airbag module, in particular for use in motor vehicles, where the airbag module is arranged on a frame, preferably a metal frame, connected with a decor carrier of an instrument panel, and attached to the decor carrier but not to a cross member supporting the instrument panel. The flexible airbag flap can essentially be supported by the airbag arranged in the airbag module. The decor carrier is designed as one piece with the flexible airbag flap and in the area of the flexible airbag flap has a reduced wall thickness. Also disclosed is a method for production of such a flexible airbag flap with the steps of arranging the frame and preferably an additional layer covering the frame in a forming tool, and connecting the frame with a material, preferably a foaming material, that forms the decor carrier and the flexible airbag flap.

21 Claims, 6 Drawing Sheets

FOREIGN PATENT DOCUMENTS

| | | |
|---|---|---|
| EP | 1 106 445 A1 | 6/2001 |
| EP | 1 354 773 A | 10/2003 |
| EP | 1 354 773 A1 | 10/2003 |
| JP | 07 069 159 A | 3/1995 |
| JP | 7-069159 | 3/1995 |
| WO | WO 02/14117 A1 | 2/2002 |
| WO | WO 03/045738 A1 | 6/2003 |

\* cited by examiner

FLEXIBLE AIRBAG FLAP

FIELD OF THE INVENTION

The invention relates to a flexible airbag flap of an airbag module, in particular for use in motor vehicles, and a method for the production thereof.

PRIOR ART

For the protection of the passengers in motor vehicles an airbag arranged in an airbag module is usually mounted behind an interior trim panel fitted with a decor layer. In the event of a collision, a shot module also mounted in the airbag module is activated, whereby an airbag usually arranged folded or rolled up is filled explosively with a gas. By the associated volume expansion of the airbag, parts of the interior trim are blasted from their position or at least bent to one side.

Here the interior trim panels are designed such that they break open along previously defined tear lines and thereby allow the unhindered expansion of the airbag to its desired size. In this process, above all it must be ensured that the passengers to be protected by the airbag cannot be hindered or hurt by the usually rigid interior trim parts. This is particularly important if the passengers are not in the usual upright sitting position, but have been moved "out of position" during the collision.

In the past, this problem also led to more stringent legal requirements for a new design of the decor carrier arranged above an airbag.

Therefore flexible covers were developed for an airbag module, wherein firstly the mass to be moved by the expanding airbag was reduced to a minimum and secondly the risk of injury was reduced even in the case of contact of the vehicle passenger with the flexible airbag cover. In addition, EP 1 106 445 A1 proposed an airbag system integrated into an interior trim part wherein the airbag module can be fastened solely to the decor carrier. For this purpose, EP 1 106 445 A1 provides installing the airbag module from the side of the decor carrier facing the vehicle passenger, covering this with a foam layer and connecting the flexible cover with part of the airbag over a large area. However, this process proved in practice to be especially time-consuming and caused considerable disadvantages in view of the surface quality of the decor carrier and the processing safety when using the airbag.

DESCRIPTION OF THE INVENTION

The object of the invention is therefore to provide a flexible airbag flap of an airbag module without the problems in the prior art.

According to the invention, a frame, preferably a metal frame, is connected with a decor carrier of an instrument panel and the airbag module fastened to this frame. Here there is no need also to attach the airbag module to a cross member supporting the instrument panel. According to the present invention, the decor carrier is produced as one piece and has reduced wall thickness in the area of the flexible airbag flap. The flexible airbag flap is essentially supported by the airbag stored in the airbag module below the decor carrier. In the method of producing such a flexible airbag flap, the frame according to the invention is arranged in a forming tool and then connected to a material, preferably foaming, and forming the decor carrier and the flexible airbag flap.

The flexible airbag flap according to the invention can be produced particularly simply and preferably in a single operation and provides sufficient surface quality and process safety. It has surprisingly been shown that on use of a frame integrated in the decor carrier to attach the airbag module, the wall thickness and hence also the mass of the flexible airbag flap can be reduced to a minimum even when the decor carrier is designed and produced as one piece, while still retaining a sufficient stability of the airbag covering and the required process safety when the airbag is deployed. In addition, the flexible airbag flap according to the invention surprisingly provides the possibility of providing a tolerance compensation of around 2 mm between the decor carrier and the airbag module and hence compensate for production inaccuracies of components to be mounted without disadvantages for the process safety.

The flexibility of the airbag flap according to the invention is regularly guaranteed if the material is able to be bent without essential additional force. This is also guaranteed if the flexible material has a certain rigidity to guarantee its function of covering the airbag. An essential criterion for flexibility of the cover in the sense of the invention is normally the reduction of the mass to be moved and reduction of the force necessary to expand the airbag.

In a preferred embodiment of the airbag flap according to the invention, the reduced wall thickness of the decor carrier in the area of the flexible airbag flap is 1 to 3 mm. In a particularly preferred embodiment the wall thickness is 1.5 to 2 mm. This advantageously provides a flexible airbag flap in which the wall thickness has been reduced to a minimum but which still guarantees adequate stability of the decor carrier and the necessary protection for the airbag arranged below the decor carrier, in particular against mechanical damage from vehicle passengers or objects in the vehicle.

In a further preferred embodiment of the invention the decor carrier on the side facing the vehicle interior is also covered with a decor layer. In a particularly preferred embodiment of the invention this additional decor layer comprises leather or a leather-like material. This creates an interior trim part for a vehicle which offers a particularly advantageous appearance with almost the same process safety on deployment of the airbag.

In a particularly preferred embodiment the additional decor layer provided also has at least partially weakening areas which serve as tear points or tear lines when the airbag expands. The tear lines can have any conceivable shape which allows complete opening of the airbag. Preferred shapes are preferably straight lines, an essentially U-shaped or H-shaped design but also a cross or pyramidal form in which the central line essentially running from the tips has weakening lines extending at least partly up to the corner areas of the airbag flap.

The weakening lines can be arranged both symmetrically and asymmetrically on the airbag flap. It is however preferred that due to the arrangement of the weakening lines, the opening behaviour of the airbag is not negatively affected.

In a greatly preferred embodiment these weakening areas are arranged in the edge areas of the flexible airbag flap. This creates an interior trim part with integral flexible airbag flap in which the decor layer tears along predefined lines and hence advantageously supports the expansion of the airbag.

In a further advantageous embodiment of the present invention the flexible airbag flap has one or more hinges about which it can fold as the airbag expands. In a particularly preferred embodiment these hinges are formed by non-weakened parts of the decor carrier and/or the decor layer. In a particularly preferred embodiment, the hinges are also arranged aligned to the tear lines above. In a greatly preferred embodiment the hinges are also fitted with a flexible reinforcement, preferably of a textile material.

This quite advantageously creates a flexible airbag flap which tears along a predefined folding edge out of the danger area for the vehicle passenger and also allows predefinition of the deployment direction for the expanding airbag. Also, in particular with the use of an additional flexible reinforcement, it is guaranteed that even after release of the airbag, the flexible airbag flap remainsconnected with the decor carrier at least at one retaining point and cannot fly through the passenger compartment uncontrolled.

In a further preferred embodiment of the invention the flexible airbag flap, at least on the areas with which it can come into contact with the airbag on expansion, has a coating with particular slip properties, preferably Teflon. This creates an airbag flap which quite advantageously supports the sliding of the airbag along the flap. The airbag can slide along the flap better and more quickly, reducing firstly the danger of injury from the airbag material and secondly the danger of flying particles.

In a further preferred embodiment of the invention, between the airbag and the decor carrier is provided a layer of a flexible material, preferably completely foamed. This flexible material is preferably arranged in the flexible airbag flap such that it extends over the folding area of the airbag flap and thus the flexible reinforcement described above constitutes a part of the flexible material.

In a particularly preferred manner this flexible material is a polyamide textile. In a quite preferred embodiment the foamed layer is a textile mat, preferably a mesh fabric or fleece comprising thermoplastics, preferably polyamide-PVC or polyester. In a greatly preferred embodiment of the invention this foamed layer comprises a laminate of at least two layers, where preferably at least one of the layers is coated at least partially.

In a further preferred embodiment of the invention the foamed layer comprises a waffle textile which preferably acts in a space-filling way. Thus in a particularly simple manner a saving can be made in the material used without a reduction in stability of the airbag flap. In particular when such a waffle textile is used, the breakage behaviour is set particularly advantageously, where preferably any particle ejection on triggering of the airbag can be reduced.

In a further preferred embodiment of the invention, a mat, preferably partially reinforced in the area of the weakening zones, is arranged in the airbag flap. In a particularly preferred manner this mat comprises a textile in which the reinforcement is preferably achieved by a reduction in the hole pitch during weaving.

Furthermore in a preferred embodiment of the invention the decor carrier and the airbag module are mounted on each other, preferably screwed together, only after production of both construction elements.

This creates a device in which the airbag secured in the airbag module remains separate from the decor layer. This avoids chemical interaction between the decor carrier material and the airbag fabric. Furthermore such an assembly also reliably prevents a lateral penetration of the decor carrier material into the airbag, for example by uncontrolled foaming of the decor carrier material at least locally.

In an advantageous embodiment of the invention, the connection between the decor carrier and the airbag module and/or the frame is achieved via connecting means integrated in the decor carrier. In a particularly preferred embodiment these connecting means are threaded bushes in which suitable connecting elements, for example screws or similar, can be introduced through the frame into the bushes. Thus a particularly simple and secure connection of the airbag module with the decor carrier is achieved, where an additional support of the airbag module in particular on the cross member can be omitted.

The frame for support and attachment of the airbag module to the decor carrier is not restricted in its shape and material. Any frame able to offer adequate rigidity and size for secure mounting of the airbag module and free unhindered passage for the expanding airbag is covered by the inventive concept.

In an advantageous embodiment of the invention however the frame is made from a metal, preferably steel or aluminium. This gives a frame which can be produced particularly simply for example by punching from a sheet, allows any necessary retouching work and in addition can support the decor carrier.

In a further preferred embodiment of the invention the frame can also be made of a plastic mixed with synthetic or natural fibres and has a structure as described in DE 101 60 185 A1. This publication is hereby introduced as a reference and thus forms part of the disclosure.

In a further preferred embodiment of the invention the frame has a form which corresponds to that of the flexible airbag flap. In a quite preferred embodiment the size and shape of the frame are structured so that the inner edges of the frame are arranged essentially below the side edges of the flexible airbag flap. This particularly advantageously supports the mounting of the flexible airbag flap. Furthermore in this particularly preferred embodiment the inner edges of the frame particularly advantageously support the tearing and folding of the flexible airbag flap.

In a further preferred embodiment of the invention a flexible layer is arranged between the frame and the decor carrier so that it not only covers the inner edge of the frame but in addition also at least partly covers or surrounds the outer edges of the frame. This achieves firstly, that after attachment of the decor carrier material to the airbag module, a smooth non-slip base is created for the flexible airbag flap, whereby the support of the airbag flap is supported particularly advantageously.

In a further preferred embodiment of the invention the decor carrier essentially consists of a thermoplastic or polyurethane. In a particularly preferred embodiment the polyurethane is also mixed with long glass fibres. This gives a decor carrier material which can be processed particularly simply and can have strength and rigidity which can be set almost arbitrarily.

In a further embodiment of the invention the flexible airbag flap is also connected with the decor carrier and/or the frame via a flexible retaining strap. In a preferred embodiment of the invention this flexible retaining strap comprises a metal or textile strip which is preferably connected directly with the decor carrier on foaming.

This gives a means which is especially simple to produce and which ensures that even after any uncontrolled tearing of the hinge areas, a blasting of the flexible airbag flap away from the decor carrier will not result in the flexible airbag flap being able to fly in particular in the direction of the vehicle passengers to be protected.

According to a further aspect of the present invention a method is provided for production of a flexible airbag flap described above, which allows the decor carrier, formed as one piece with integral flexible airbag flap, to be produced in a single working step within a forming tool.

Here the frame is arranged in a forming tool. The decor carrier material is then introduced into the forming tool and then, preferably by foaming, completely forms the decor carrier with a flexible airbag flap arranged above the frame.

In a preferred embodiment of the method the frame is already covered on its top with an additional layer. This gives an interior trim piece which can preferably hold the airbag module without any further processing step, where contact of the airbag and decor carrier material is reliably prevented by the additional layer.

The method according to the invention is characterised in that the reduced wall thickness in the area of the flexible airbag flap is essentially set for the entire decor carrier during the forming process. The method is thus particularly economical in time and money. In addition a decor carrier is provided which has a complete surface layer facing the passenger compartment, which simplifies in particular the covering or gluing even with high quality decor materials, for example leather.

In a preferred embodiment of the method according to the invention, after forming, additional tear points and/or tear lines are made in the decor carrier and/or the decor layer. This ensures a reliable and targeted deployment of the airbag without substantial hindrance by the decor carrier and decor layer arranged above the airbag.

In a particularly preferred embodiment of the method according to the invention these additional tear points and/or lines are perforations or preferably weakening lines interrupted by retaining webs which are preferably generated by milling, boring, laser cutting or cutting in particular with a heated cutting tool. This gives a method in which the weakening areas, tear points and lines can be generated and set particularly simply in a targeted manner.

In a further preferred embodiment of the process according to the invention the decor carrier is essentially made of polyurethane mixed with glass fibres. In a particularly preferred embodiment the glass fibres have a length which allows the strength of the decor carrier material to be set particularly advantageously. In a particularly preferred embodiment the glass fibres are connected with the polyurethane by means of long fibre injection (LFI).

This gives a method which is particularly easy to apply and which offers the specialist a particularly wide range of adjustment options in processability, strength and flexibility of material.

In a further preferred embodiment of the method according to the invention the frame is arranged in the forming tool such that the frame is integrated in the decor carrier in one working process. In a particularly preferred embodiment the frame is integrated within the decor carrier by foaming of the decor carrier material both from the top of the frame and from its underside so that the frame is totally surrounded by decor carrier material. In a most particularly preferred embodiment the frame is covered again from above with an additional layer.

This gives a process which allows a particularly intimate connection of the frame and decor carrier, whereby the attachment and support of the airbag module on the decor carrier are supported particularly advantageously.

In a further preferred embodiment of the method according to the invention the frame is connected with the decor carrier such that the connecting means of the decor carrier, preferably the threaded bushes, are accessible for subsequent assembly of the airbag module without essential reworking. This allows a particularly economic and time-saving production of an interior trim part with airbag module arranged thereon.

BRIEF DESCRIPTION OF THE DRAWINGS

The invention is described in more detail below with reference to FIGS. 1 through 6. The views in FIGS. 1 through 6 show merely example embodiments of the invention and are not suitable for restricting the inventive concept in any way.

FIGS. 4a through 6 show cross-sections of airbag flaps along a hinge portion according to various differing embodiments.

METHOD OF PERFORMANCE OF THE INVENTION

Figure 1A:
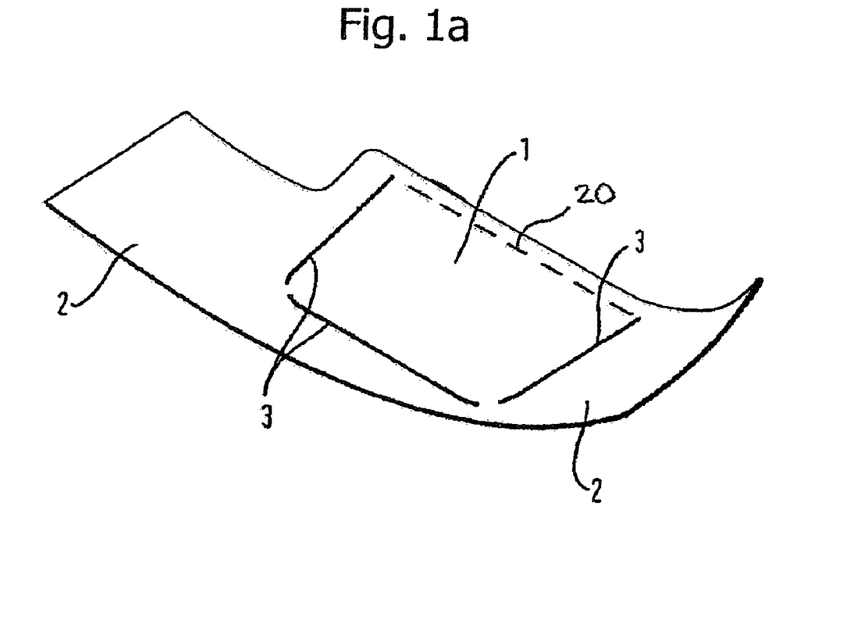
FIGS. 1a and 1b show perspective views of a decor carrier formed as one piece with integral flexible airbag cover.
Figure 1B:
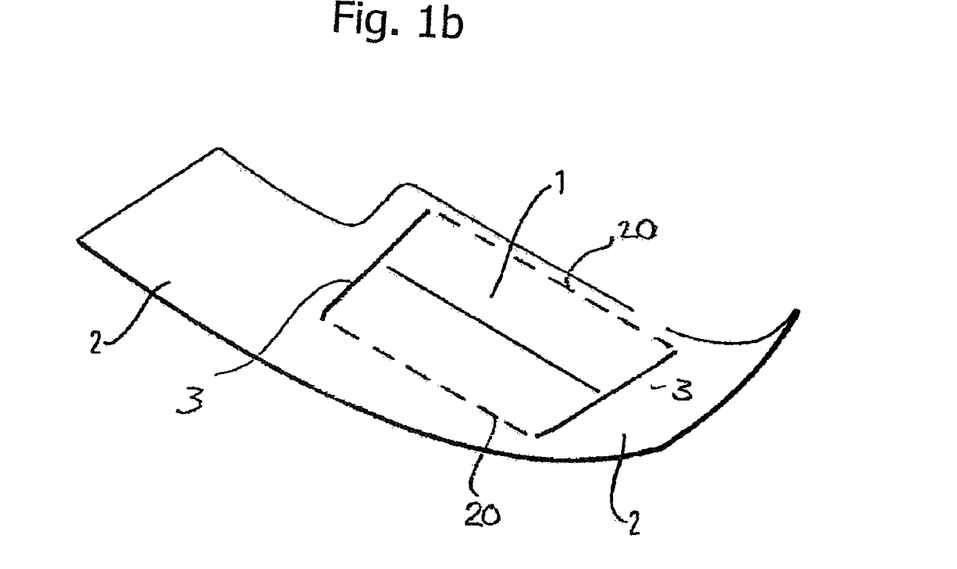

FIGS. 1a and 1b show, in perspective, a decor carrier 2, the shape of which can be designed almost arbitrarily according to the requirements of the vehicle manufacturer. Within this decor carrier 2, formed as one piece, is arranged a flexible airbag cover 1, the shape and dimensions of which are indicated by the opening lines 3 (weakening zones) and hinges 20, shown schematically. The decor carrier 2 in the area above the opening lines 3 has a wall thickness which is essentially even throughout. Inside the opening lines 3 in the area of the flexible airbag cover 1, however, the wall thickness of the decor carrier 2 is clearly reduced.

Figure 2:
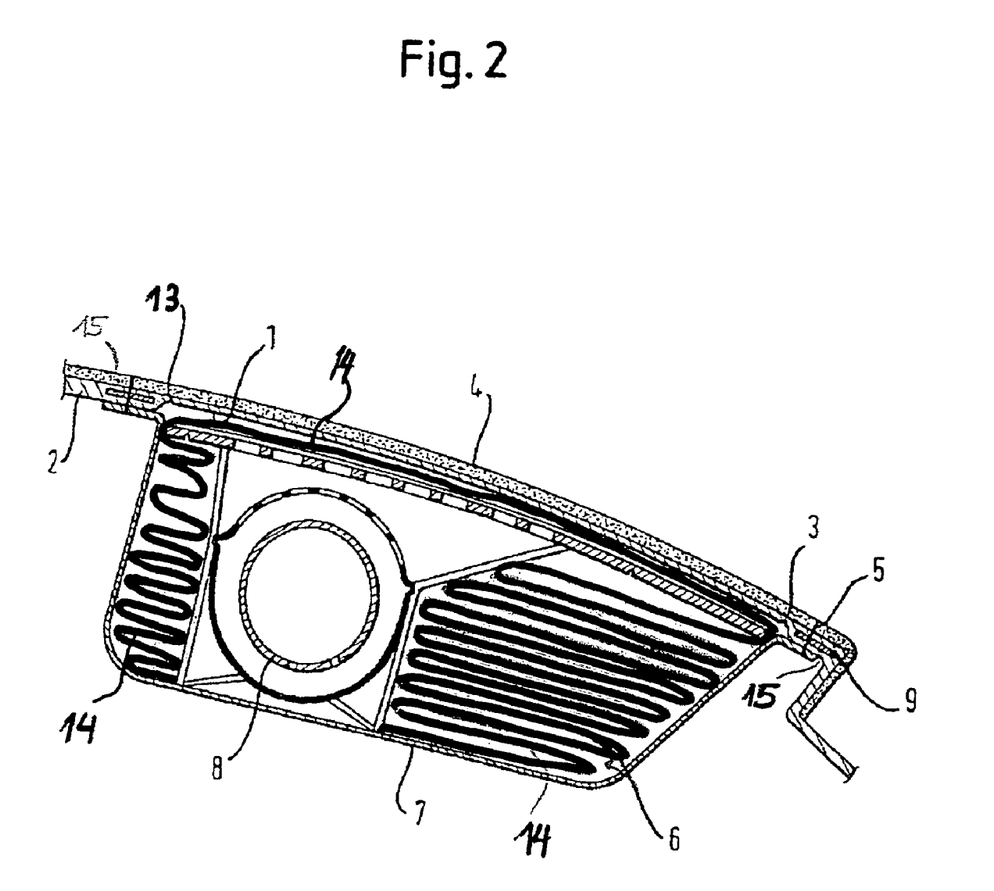
FIG. 2 shows a cut side view of an airbag module connected with the decor carrier and housing an airbag.

FIG. 2 shows a section view of an airbag module 6 connected with the decor carrier 2 of an instrument panel. The airbag module 6 has a module housing 7 in which is arranged a gas generator 8 below an airbag 14, shown schematically. The module housing 7 on its side facing the decor carrier 2 is designed so that it follows the underside of the decor carrier 2 and hence the side of the decor carrier 2 facing away from the vehicle passengers. Between bending edges of the module housing 7 arranged parallel to the decor carrier 2 and the underside of a decor layer 4 arranged over the decor carrier 2, a frame 9 is integrated in the decor carrier material (at reference numeral 15). The airbag module 6 is connected with the decor carrier 2 by suitable push-through elements, for example screws are pushed through the bending edges of the module housing 7 and the frame 9 into threaded bushes 5 (shown schematically) arranged inside the decor carrier 2. As noted above, the decor layer 4 is arranged above the decor carrier 2. In FIG. 2 the opening lines 3 of FIG. 1 are shown as having a reduced wall thickness 13.

Figure 3:
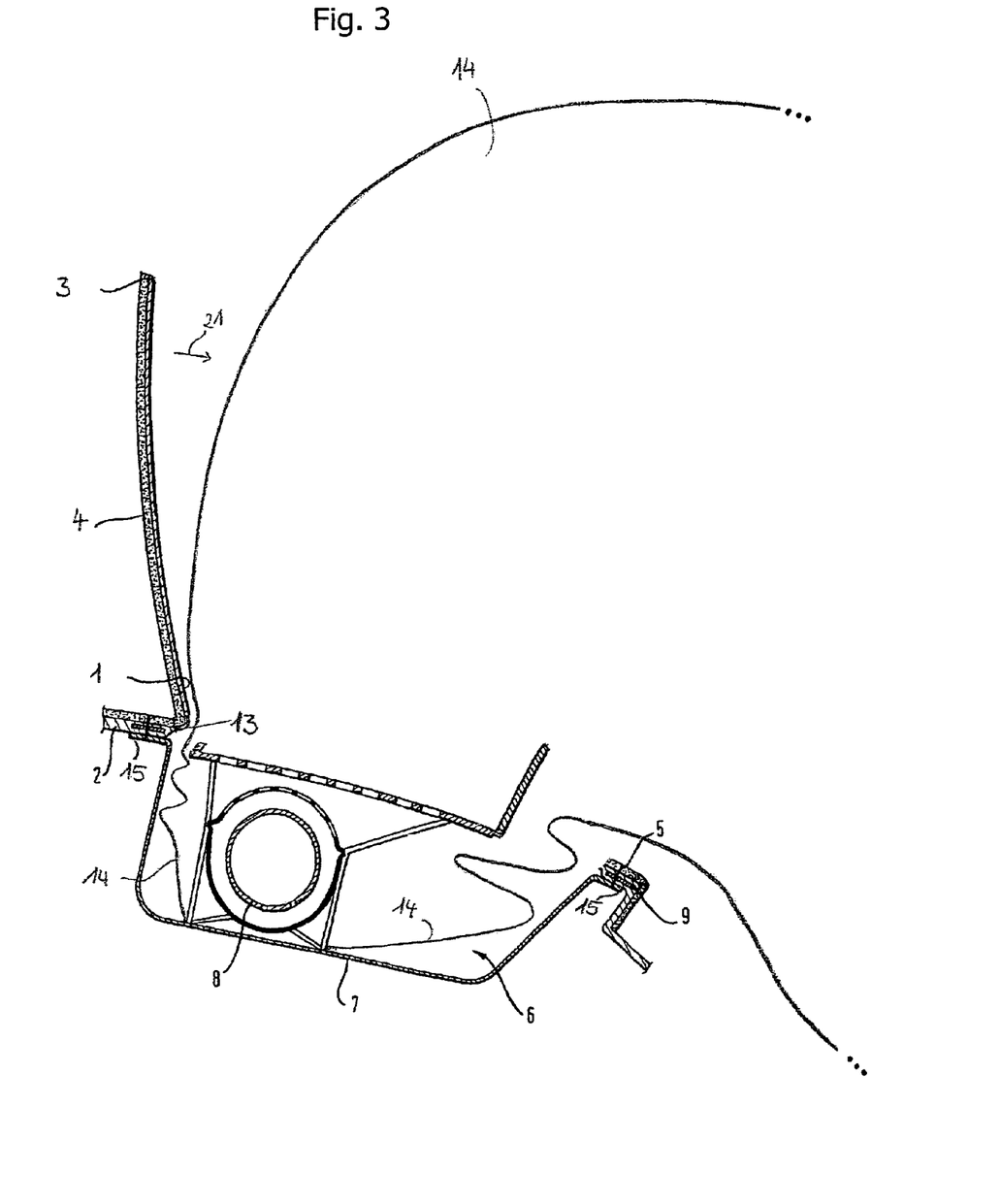
FIG. 3 shows the cut side view of the airbag module of FIG. 2 with the airbag deployed.

FIG. 3 shows a section view of an airbag module 6 connected with the decor carrier 2 of an instrument panel, as shown in FIG. 2, but with the airbag 14 in the process of deployment. Reference numerals also appearing in FIG. 2 denote the same or analogous elements to those discussed with respect to FIG. 2 above. Reference numeral 21 schematically illustrates operation of the hinges 20, about which the flexible airbag cover 1 can fold as the airbag expands. The above-described hinges 20 are preferably arranged aligned to tear lines and/or are fitted with a flexible reinforcement, preferably of a textile material. This quite advantageously creates a flexible airbag flap which tears along a predefined folding edge out of the danger area for the vehicle passenger and also allows predefinition of the deployment direction for the expanding airbag. Also, in particular with the use of an additional flexible reinforcement, it is guaranteed that even after release of the airbag 14, the flexible airbag flap 1 remains connected with the decor carrier 2 at least at one retaining point and cannot fly through the passenger compartment uncontrolled.

Figure 4A:
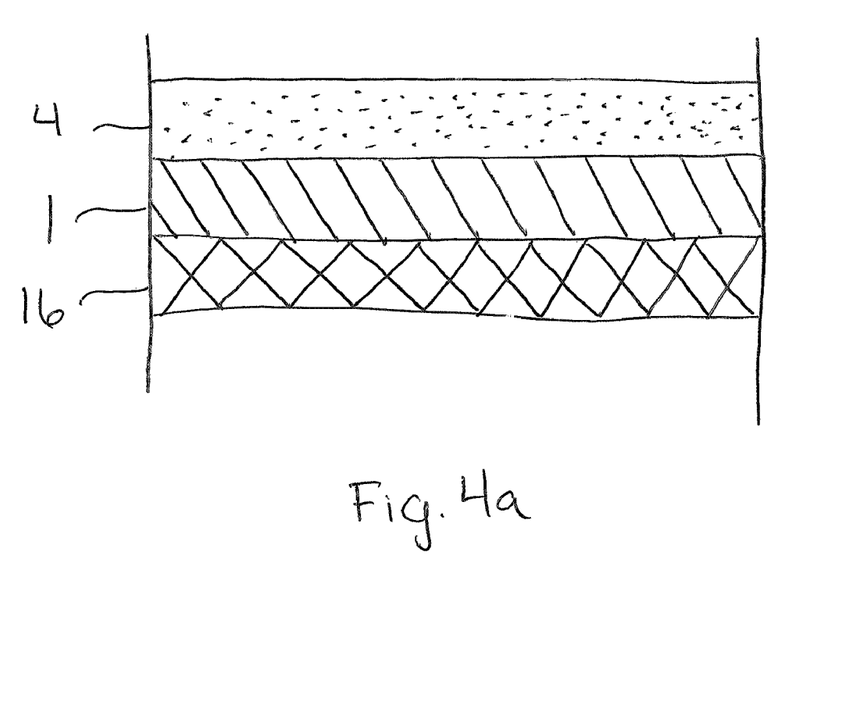
Figure 4B:
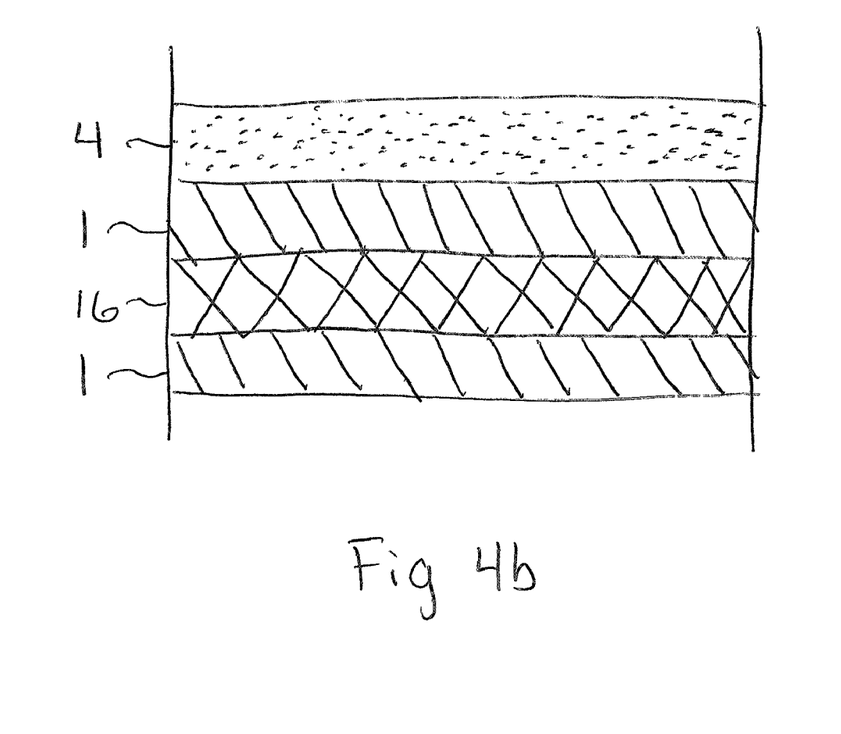
Figure 5A:
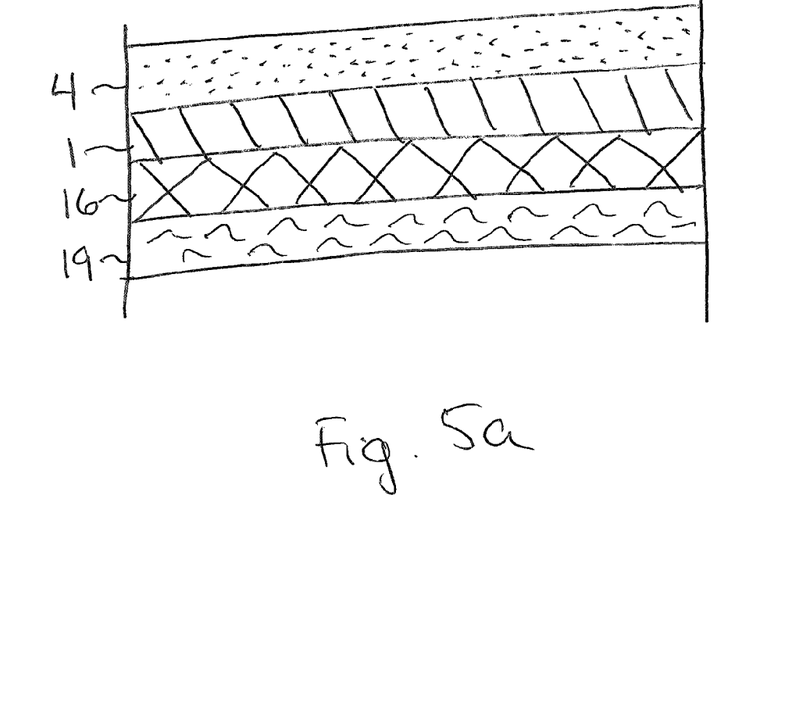
Figure 5B:
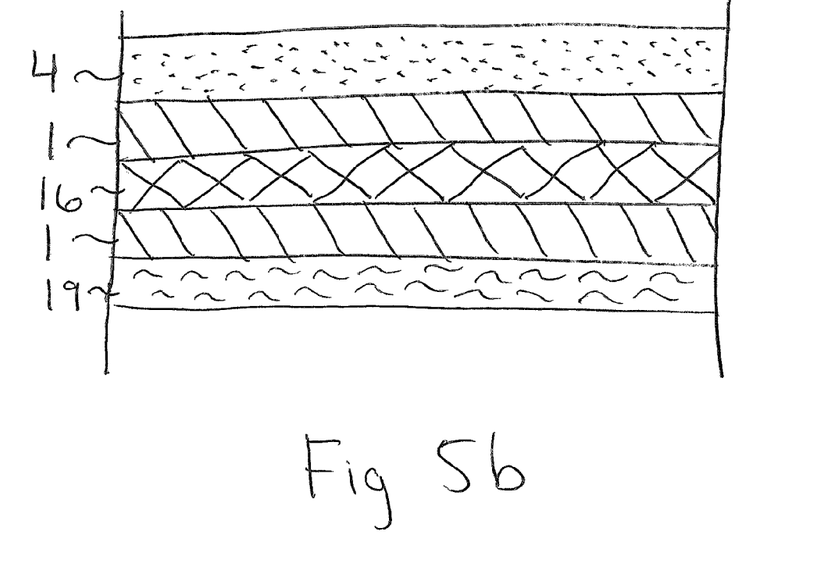
Figure 6:
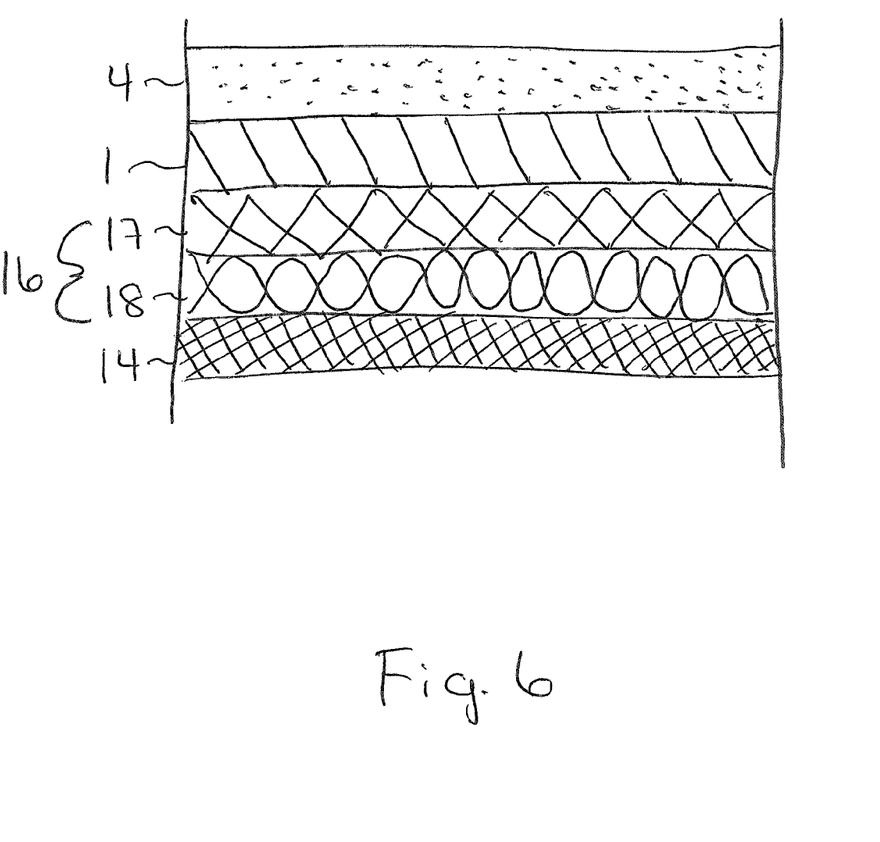

FIGS. 4a through 6 are schematic figures that show cross-sections of airbag flaps 1, along the hinge 20, with decor layers 4 according to various differing embodiments. In one embodiment, for instance, a layer of a flexible material 16 is provided between the decor carrier 2 and the airbag 14 (FIG. 4a). This flexible material 16 is preferably arranged in the flexible airbag flap 1 (FIG. 4b). The flexible material 16 is provided to extend over the folding area (i.e., hinge 20) of the airbag flap 1 and thus the flexible reinforcement described above constitutes a part of the flexible material 16. This flexible material 16 is preferably a textile mat, e.g. a mesh fabric or fleece, made of thermoplastics, preferably polyamide-PVC or polyester. In other embodiments, as shown in FIGS. 5a and 5b, a coating layer 19 having slip properties, such as Teflon®, can be provided between the airbag flap 1 and the airbag 14 (i.e., areas where the airbag flap 1 comes into contact with the airbag 14 upon expansion of the airbag flap 14). In yet another embodiment, as shown in FIG. 6, this foamed flexible material layer 16 comprises a laminate of at least two layers 17, 18. The embodiment of FIG. 6 also depicts the placement of the airbag 14 itself (i.e., under the airbag flap 1).

What is claimed is:

1. An arrangement comprising:
   a flexible airbag flap and an airbag module housing an airbag, wherein
   the airbag module is arranged on a frame, other than a cross member of an instrument panel, the frame being integrated into a decor carrier of the instrument panel, and
   the decor carrier forms an integral piece with the flexible airbag flap and is reduced in wall thickness in an area defining the flexible airbag flap, and
   the frame, both from the top and from the underside, is foamed, such that the frame is surrounded with material of the decor carrier.

2. The arrangement according to claim 1, wherein the reduced wall thickness of the decor carrier in the area of the flexible airbag flap has a thickness of 1-3 mm.

3. The arrangement according to claim 1, wherein the decor carrier is completely covered with a decor layer.

4. The arrangement according to claim 3, wherein the decor layer has at least partial weakening zones which serve as tear points on deployment of the airbag.

5. The arrangement according to claim 1, wherein the flexible airbag flap has at least one hinge about which the flexible airbag flap folds as the airbag expands.

6. The arrangement according to claim 5, wherein the at least one hinge is formed by non-weakened areas of at least one of the decor carrier and a decor layer.

7. The arrangement according to claim 5, wherein in the area of the at least one hinge, an additional flexible reinforcement is connected with the decor carrier.

8. The arrangement according to claim 1, wherein the decor carrier and the airbag module are fastened together by a fastener integrated into the decor carrier.

9. The arrangement according to claim 1, wherein an additional layer of flexible material is arranged between the airbag and the decor carrier.

10. The arrangement according to claim 9, wherein the additional layer is a textile matting.

11. The arrangement according to claim 9, wherein the additional layer is a laminate of at least two layers.

12. The arrangement according to claim 9, wherein a layer of Teflon® is provided between the layer of flexible material and the airbag.

13. The arrangement according to claim 1, wherein the frame comprises a plastic mixed with reinforcement fibers.

14. The arrangement according to claim 1, wherein the decor carrier comprises polyurethane mixed with glass fibers.

15. A method for producing a flexible airbag flap and an airbag module, the airbag module being arranged on a frame, other than a cross member of an instrument panel, the frame being integrated into a decor carrier of the instrument panel, the decor carrier forming an integral piece with the flexible airbag flap and being reduced in wall thickness in an area defining the flexible airbag flap, the method comprising:
   connecting the frame with a material, to form the decor carrier and the flexible airbag flap, and
   foaming the frame both from the top and from the underside, thereby surrounding the frame with the decor carrier material.

16. The method according to claim 15, wherein the reduced wall thickness in the area defining the flexible airbag flap is created during forming of the decor carrier.

17. The method according to claim 15, further comprising providing, in the area defining the flexible airbag flap, at least one of tear points and tear lines.

18. The method according to claim 15, wherein the decor carrier is made from polyurethane mixed with glass fibers.

19. The method according to claim 18, wherein the glass fibers are connected with the polyurethane using long fiber injection (LFI).

20. The method according to claim 15, wherein the frame integrated in the decor carrier is produced in one work process.

21. The method according to claim 15, further comprising fastening the airbag module to the decor carrier with a fastener integrated into the decor carrier.

* * * * *